United States Patent [19]
Redd

[11] Patent Number: 6,070,832
[45] Date of Patent: Jun. 6, 2000

[54] ULTRASONIC ANGULAR MEASUREMENT SYSTEM

[75] Inventor: Justin D. Redd, California City, Calif.

[73] Assignee: The United States of America as represented by the Secretary of the Air Force, Washington, D.C.

[21] Appl. No.: 08/193,684

[22] Filed: Feb. 8, 1994

[51] Int. Cl.$^7$ .............................. B64D 1/12; G01S 15/02
[52] U.S. Cl. .................. 244/137.3; 14/71.1; 73/628; 367/96; 367/99; 410/69; 414/537; 414/575.1
[58] Field of Search .................................. 14/71.1–71.5; 73/628; 244/118.1, 137.1–137.3; 367/35, 95–97, 99; 410/67, 69; 414/505, 537, 575.1

[56] References Cited

U.S. PATENT DOCUMENTS

| | | | |
|---|---|---|---|
| 4,528,651 | 7/1985 | Brock et al. | 367/99 |
| 4,544,319 | 10/1985 | Folling et al. | 414/505 |
| 4,685,092 | 8/1987 | Dumont | 367/35 |
| 4,733,380 | 3/1988 | Havira | 367/35 |
| 4,769,793 | 9/1988 | Kniest et al. | 367/99 |
| 4,868,796 | 9/1989 | Ahrens et al. | 367/99 X |
| 4,949,321 | 8/1990 | Magori | 367/99 |
| 5,014,935 | 5/1991 | Dalbera | 244/137.1 |
| 5,062,087 | 10/1991 | Dydzyk | 367/99 |
| 5,090,638 | 2/1992 | Eilenstein-Wiegmanns et al. | 244/118.1 |
| 5,098,038 | 3/1992 | Hruska et al. | 244/137.1 |
| 5,104,064 | 4/1992 | Kuitems | 244/118.1 |
| 5,184,366 | 2/1993 | Rawdon et al. | 14/71.5 |
| 5,287,627 | 2/1994 | Rando | 367/99 |

OTHER PUBLICATIONS

Marioli, Daniele et al, "Ultrasonic Distance Measurement for Linear and Angular Position Control", IEEE Transactions on Instrumentation and Measurement, vol. 37, No. 4, Dec. 1988 pp. 578–581.

Published Technical paper, Jun. 22–24 1993, Seventeenth Transducer Workshop, San Diego, CA, entitled "An Ultrasonic Angular Measurement System" by inventor Justin D. Redd, pp. 252–259.

Published Technical paper, Oct. 25–28 1993, International Telemetering Conference, Las Vegas, Nevada, entitled "An Ultrasonic Angular Measreuemtn System" by Inventor Justin D. Redd, pp. 747–754.

*Primary Examiner*—Andres Kashnikow
*Attorney, Agent, or Firm*—William G. Auton

[57] ABSTRACT

An ultrasonic angular measurement system is disclosed. The system is comprised of three parts, a control box used to collect and process data, an ultrasonic transducer, and a reflector block. The reflector block is configured so that it intercepts transmitted pulses received over a wide range of angles back to the transducer. All the components are self contained within a transportable housing which is attached to the aircraft deck during measurement of tip-off angle. The range of angle measurement is permitted because of the use of the unique reflector block which comprises a plurality of reflector segments for reflecting ultrasonic pulses transmitted at various ranges of angles.

8 Claims, 2 Drawing Sheets

ULTRASONIC ANGULAR MEASUREMENT SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention comprises an ultrasonic angular measurement system for the purpose of measuring the tip-off angle of a cargo pallet as it is being extracted from a cargo aircraft in flight. The tip-off angle is the angle between the deck of the aircraft and the cargo pallet. Generally, a parachute is used to pull the pallet out of the open rear cargo doors of the aircraft, and as the pallet exits, it begins to tip, and the tip-off angle increases until the pallet leaves the aircraft. It is important to measure the tip-off angle in order to determine the stability and consequent safety of various pallet loading schemes. If the pallet tip too rapidly, or too much, it can become entangled in parachute lines or damage the aircraft. Each loading scheme must, therefore, be tested and qualified before operational use. Consequently there is a need for a system which can accurately measure and record cargo pallet tip-off angles.

Various methods have been proposed to measure angular displacement using optical or ultrasonic methods. Optical angular measurement devices have been demonstrated involving reflective surfaces, optical code plate sensors, encoded diffraction grating, and photodiode arrays. The optical methods all require modification of the object to be measured (such as attaching mirrors) or contact with the object (such as connection to a shaft). Ultrasonic methods have proven more useful in applications where contact with or modification of the object to be measured is not possible.

One system used for measuring the tip-off angles during pallet drops from an aircraft uses a spring loaded swiveling arm just past the rear edge of the cargo deck. The arm is connected to a potentiometer so that as the pallet begins to tip, it moves the potentiometer to develop a voltage proportional to angle. This system has many disadvantages. First it is not as accurate as required. Further, when the pallet initially contacts the swivelling arm, it is travelling at a fairly high velocity, so that the initial shock to the arm causes it to bounce past the desired position, and the bouncing and ringing in the arm caused by the return spring cause the initial data to be inaccurate. Moreover, the mechanical assembly must be attached to the trailing edge of the aircraft, and then wires must be run to it for power, data recording, etc. These modifications to the aircraft can interfere with normal cargo door operation, and therefor usually require a specially modified test aircraft. In addition, the mechanical assembly and wiring can catch on the exiting pallet and be torn loose from the aircraft.

Another system for measuring tip-off angles uses a high speed video camera mounted inside the cargo aircraft looking at the side of the pallet, or is carried by another aircraft flying along side the cargo aircraft. In either case, the goal is to obtain a perfect side view of the pallet and cargo deck combination. The recorded video is the projected onto a "white board", one frame at a time. For each frame, a line is manually drawn on the white board corresponding to the cargo deck, and another is drawn along the edge of the cargo pallet. Then a protractor is used to measure the angle between the two lines. The angle measurement process is repeated for each frame. Because of vibration and lighting in the aircraft, the images recorded by the camera can be somewhat blurred. The movement of the aircraft and pallet can also make the optimum side view image difficult to obtain. These problem combine to make it difficult to determine where to draw the line on the white board during data reduction, and consequently, the angle accuracy is limited to 3–5 degrees. Also, the drawing of lines and measuring angles on a frame by frame basis can be long and tedious.

Because of the inadequacies of the known prior art system, there has been a need for a better system for measuring tip-off angles. The ultrasonic angular measurement system provided in accordance with this invention is capable of accuracies better than one-half degree. The disclosed system is completely self contained, battery powered so that no wiring is required, and provides automatic data recording. After the pallet drop, the data can be transferred in digital format directly to a computer which can complete all the required calculations within minutes. Furthermore, installation of the disclosed system requires no modification, or at most minimal modification to the aircraft, and the system is easily transferred to other aircraft.

SUMMARY OF THE INVENTION

The ultrasonic angular measurement system disclosed in accordance with this invention comprises three parts, a control box used to collect and process data, an ultrasonic transducer, and a unique reflector block. All the components are self contained within a transportable housing which is attached to the aircraft deck during measurement of the tip-off angle. The range of angle measurement is permitted because of the use of the unique reflector block which comprises a plurality of ref lector segments for reflecting ultrasonic pulses transmitted at various ranges of angles.

BRIEF DESCRIPTION OF THE DRAWINGS

The foregoing and other advantages, objects and features of the invention will become more apparent after considering the following description taken in conjunction with the illustrative embodiment in the accompanying drawings, in which.

DESCRIPTION OF THE PREFERRED EMBODIMENT

Figure 1:
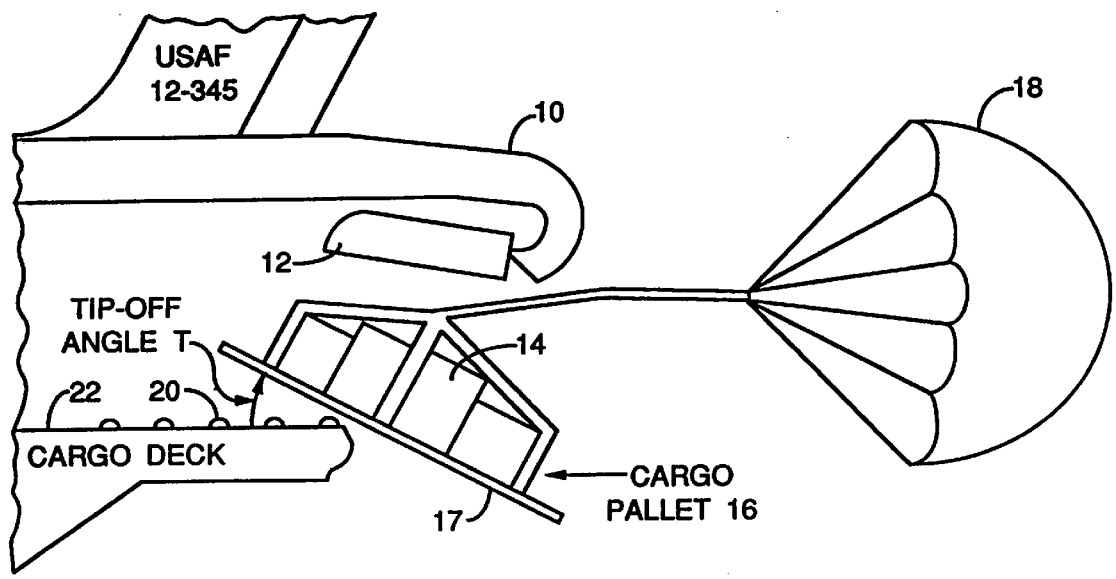
FIG. 1 is a diagram showing a cargo pallet being extracted from an aircraft, and showing the tip-off angle measured in accordance with this invention.

The overall system is shown in FIG. 1 to which reference should now be made. In many military operations it is necessary to drop cargo 14 from an aircraft 10 through a cargo door 12. The cargo 14 is generally carried on a cargo pallet 16 having a planar bottom surface 17. In flight, the cargo 14, along with the pallet 16 is extracted from the aircraft by means of a parachute 18 connected to the cargo. The bottom surface 17 of the pallet 16 rides on rollers 20 supported on the planar deck 22. The pallet tips as it exits the aircraft, that is, it pivots on the axis of the roller 20 next to the aft end of the aircraft. The object of the invention is to measure the tip-off angle $T_O$ as the cargo pallet pivots.

Figure 2:
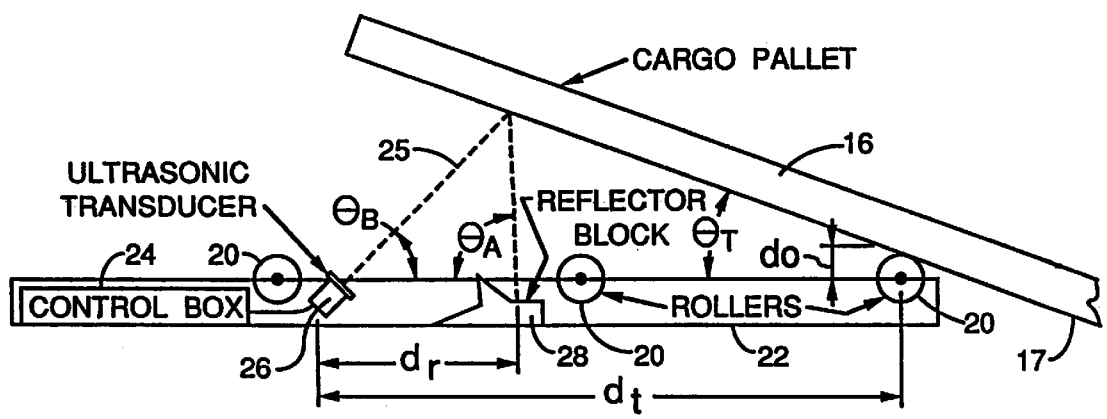
FIG. 2 is a schematic side elevation of the ultrasonic angular measurement system in accordance with this invention.

Referring now to FIG. 2, the ultrasonic angular measurement system provided in accordance with this invention comprises the combination of three components, a control box 24, a convention ultrasonic transducer 26 and a unique reflector 28. Under the control of the control box 24, the transducer 26 transmits pulses 25 at ultrasonic frequencies at a fixed angle with respect to the aircraft deck. The transmitted pulses reflect off the planar base 16 of the pallet 17 toward a reflecting surface (to be described) of a reflector block 28. The pulses are then reflected back to the pallet and then returned to the transducer. The electrical output from the transducer is then applied to the control box 24 where the data is recorded for later analysis in a computer (not shown). The system functions in a conventional manner to measure the time between the transmittal of a pulse and the receipt at the transducer of the echo, that time being a linear function of the tip-off angle $\theta_T$.

The control box 24 is generally conventional, and for that reason is shown in block diagram form. The control box functions to receive software instruction from a computer prior to installation on the aircraft, and it then provides system control for supplying electrical impulses to the transducer 25 at ultrasonic frequencies, and for receiving electrical impulses representing the return signals to the transducer.

The heart of the control box is a commercially available printed circuit board which contains a 6303 microprocessor, an analog to digital converter, timers a universal asynchronous receiver/transmitter, read only memory, and random access memory. Also included in the control box 24 are RS-232 serial communications driver circuits, power switches, light emitting diode status indicators, an ultrasonic driver module, a thermistor temperature sense, and two standard 9 volt batteries. Software is loaded into the control box from a computer via the RS-232 serial communications port.

After loading of the software into the control box 24, the computer is disconnected and power for the control box is supplied by the batteries. The two power switches control power on/off and standby/operate modes. Standby mode keeps the memory active but shuts off all other power in order to conserve the battery power. Light emitting diodes indicate low battery power, memory remaining and data recording mode (stopped, waiting for target; or recording target data). A thermistor sensor develops an analog voltage proportional to the air temperature and the voltage is the digitized by an analog to digital converter and used for calculation of the speed of sound, which varies with air temperature.

The ultrasonic driver module in the control box 24 generates high amplitude electrical pulses of 150 KHz waves which are used to drive the ultrasonic transducer 26. The ultrasonic driver module also senses the return echo signal from the transducer 26. One of the 9 volt batteries supplies the ultrasonic driver module and the other supplies the rest of the electronics.

The ultrasonic transducer 26 is a conventional piezoelectric device which operates at 150 KHz. For reasons to be explained below, the generated beam has a width of 10 degrees and no sidelobes. It converts electrical pulses generated by the control box 24 into ultrasonic waves, and it generates electrical signal for delivery to the control box 24 when excited by the return echoes of the transmitted waves.

Figure 3:
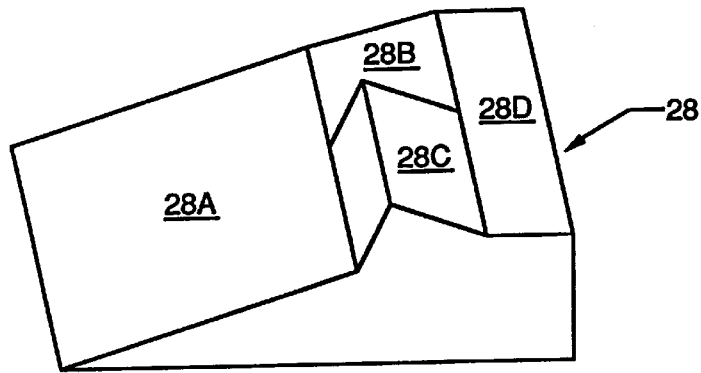
FIG. 3 is a 3-dimensional view of the reflector block used in accordance with this invention.

The reflector block 28 represents the heart of the system, since it enables the measurement of angles over a wide range. Referring to FIG. 3, the reflector block 28 is a structure machined from a solid piece of aluminum and it has various angled surfaces 28A–28D designed to reflect the ultrasonic pulses 25 back in the same direction from which they came. The block 28 is divided into sections, the angled surfaces 28A–28D, each of which is optimized for a different tip-off angular range. The object of the design of the reflector block is to simulate a continuous curved surface, and therefore, it can be seen that each surface (or facet) 28A–D is a an angle such that a continuous curved surface is approximated.

In order to understand the operation of the system, reference should again be made to FIG. 2 which is a side view of the angular measurement system and which shows the path of ultrasonic pulses from the time they leave the transducer until the echoes return to the transducer. This geometry is based on the specific application of measuring the tip-off angle of a cargo pallet being extracted from an airplane, but the system may be generalized to the measurement of the relative angle of any arbitrary flat surface. Two assumptions are necessary in order for the system to function: 1) the angle between the plane in which the transducer is mounted (the deck) and the plane of the surface whose angle is being measured (the cargo pallet) by be varied in only one dimension, that is, there may be no twist or tilt except in the angle being measured, and 2) the intersection between the two planes (the deck and the pallet) must be a fixed line. Thus the distance $d_t$ between the transducer 26 and the roller adjacent the aft end of the aircraft must be fixed.

The foregoing assumptions are valid for aircraft applications since the cargo pallet 16 slides on rollers 20 which are at a fixed distance above and parallel to the cargo deck as it leaves the airplane. In the tip-off angle application disclosed herein, the angular measurement system, including the control box 24, the transducer 26 and the reflector block 28 are mounted to the cargo deck of the aircraft at a fixed distance from the edge of the deck and the pallet slides on rollers above the system.

Variations in the angles of the surfaces of the reflector block are compensated for by the fact that the beam width of the ultrasonic pulses is 10 degrees, so that the ultrasonic pulses actually travel at approximately plus or minus 5 degrees from the beam center.

As the pallet tip-off angle increases, the pallet eventually becomes perpendicular to the path of the pulses emitted by the transducer, at which point the pulses are reflected directly back to the transducer instead of to the reflector block. By measuring the time between the transmitted pulse and the return echo, and with knowledge of the speed of sound the distance traveled by the ultrasonic pulses can be calculated by the computer.

Because of the width of the transmitted beam, the position of the pallet can be varied and still receive reflections from a reflector surface. The beam width of ultrasonic pulses produced by any transducer is fixed at a value determined by the frequency of the ultrasound, and by the construction details of the transducer. In the disclosed system, as reduced to practice, the beam with was established at 10 degrees. If the transducer is aimed directly at a flat surface, then because of the beam spread, the angle of the target can be varied between limits, and the reflection from a reflector surface can still be received by the transducer. Thus, the limit of variation of the tip-off angle is extended by providing surfaces 28A–D at different angles so that at least a portion of the wave reflected from one of the surfaces of the reflector block will be perpendicular to the planar surface 16 of the pallet, and thus the design of the reflector block makes possible the measurement of tip-off angles over a wide range.

Figure 4:
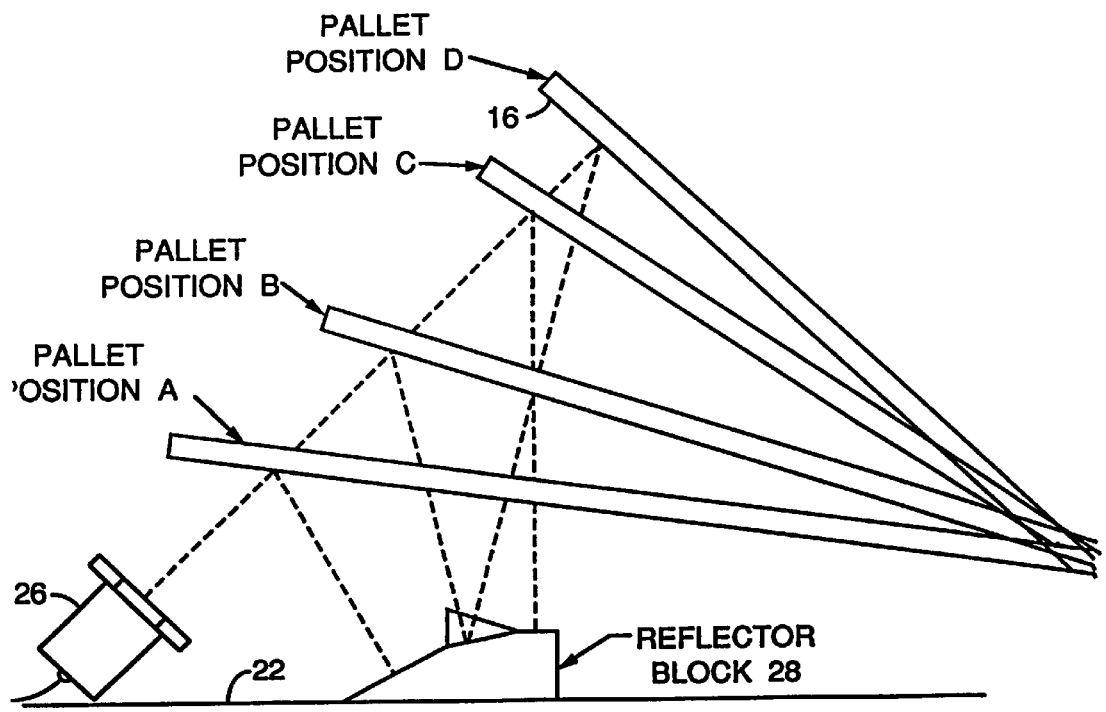
FIG. 4 is a schematic drawing showing the operation of the system at various tip-off angles.

In FIG. 4, is shown the relationship of the waves transmitted from the transducer 26 to the planar surface 17 of the pallet 17, to the reflector block 28 and back to the transducer. As previously noted, the reflector block 28 is provided with four reflecting surfaces 28A, 28B, 28C and 28D. As seen in FIG. 4, the reflection angles of the surfaces 28A–D are chosen so that a different surface of the block 28 will intercept and reflect the transmitted pulses at various pallet positions. Thus, when the pallet position is at a tip-off angle $\theta_T$ equal to from 3 degrees up to less than 10 degrees, the transmitted pulses follow path 25A and includes the surface 28A. When the pallet position is at an angle $\theta_T$ equal to 10 degrees up to less than 16 degrees, then the path of the pulse follow path 25B and includes the surface 28B. Similarly, when the pallet position is at an angle $\theta_T$ equal to 16 degrees up to less than 24 degrees, then the path of the pulse follows path 25C and includes the surface 28C. And, when the pallet position is at an angle $\theta_T$ equal to 24 degrees up to less than 29 degrees, then the path of the pulse follows path 25D and includes the surface 28D.

In the system as reduced to practice, the transducer 26 was mounted such that the center of the transmitted beam was at an angle of 48 degrees relative to the cargo deck. This angle was chosen to optimize angular range, system compactness, and pulse travel distance versus tip-off angle relationship. The ultrasonic pulses travel at an initial 48 degree angle until they contact the bottom side 17 of the cargo pallet 16. The pulses are then reflected from the bottom portion of the pallet at an angle determined by the tip-off angle $\theta_T$ of the pallet. The pulses arrive at the cargo deck at a distance $d_r$ from the transducer, and an angle $\theta_A$ relative to the deck. Both $d_r$ and $\theta_A$ are functions of the tip-off angle. The reflector block is shaped such that at any given distance $d_r$, an angular surface at the block will be approximately perpendicular to the angle $\theta_A$. The result is that pulses striking the reflector block or at least one of its surfaces are reflected back and strike the bottom of the pallet along their original path and are reflected back to the transducer. As the pallet tip-off angle increases, the pallet eventually becomes perpendicular to the path of the pulses emitted by the transducer, at which point the pulses are reflected directly back to the transducer instead of to the reflector block. By measuring the time between a transmitted pulse and the return echo, and with the knowledge of the speed of sound, the distance traveled by the ultrasonic wave, and hence the tip-off angle may be calculated.

The geometry of the system is determined in accordance with the following equations:

$$d_R = \left\{\frac{d_T \sin\theta_T + d_p \cos\theta_T}{\sin(\theta_T + \theta_B)}\right\}\left\{\cos\theta_B + \frac{\sin\theta_B}{\tan(2\theta_T + \theta_B)}\right\} \quad (2)$$

Equations 1 and 2 are the defining equations for the reflector block 28, which is designed to reflect ultrasonic beams back along the same path from which it arrived, so that it will return to the transducer 26 as an echo of the original transmitted pulse. Ideally the reflector block 28 would be a continuously curved surface such that it would be normal to the ultrasonic beam at any point that the beam is intercepted. However, the ideal continuous surface is approximated herein by a combination of flat faceted surfaces since the ultrasonic beam has a finite width, in the disclosed case, 10 degrees. By using equations 1 and 2, the point of the beam intercept and corresponding beam angle can be determined, and then a series of these points are connected to form the outline of the reflector block 26.

Clearly, many modifications and variations of the present invention are possible in light of the above teachings and it is therefore understood, that within the inventive scope of the inventive concept, the invention may be practiced otherwise than specifically claimed.

What is claimed is:

1. An ultrasonic angular measurement system for measuring the tip-off angle of a cargo pallet as it is extracted from a rear cargo door of an aircraft, said aircraft having a planar deck adjacent said rear cargo door, said cargo pallet having a planar bottom surface, the combination comprising:

means movably supporting said pallet on said planar deck with said planar bottom surface spaced from and parallel to said planar deck, said pallet pivoting on a fixed axis perpendicular to the direction of movement of said pallet as said pallet is moved out of said cargo door; and means for measuring the tip-off angle $\theta_T$ defined as the degree of pivoting of said pallet as said pallet exits said cargo door, said measuring means being mounted on said planar deck in the space between said planar deck and said pallet bottom surface, said measuring means comprising:

a transducer for transmitting pulses of an ultrasonic beam toward said bottom surface of said pallet, said pulses being transmitted at a fixed angle $\theta_B$, said beam having a predetermined beam width;

a reflector block for intercepting pulses reflected from said surface, said reflector block having a composite surface wherein a portion of said composite surface is always substantially perpendicular to said bottom surface of said pallet, whereby at least a portion of the beam pulse reflected from said bottom surface of said pallet to said reflector block is reflected back to said bottom surface and to said transducer in the path from which it came; and means for measuring the round trip time of said pulse from and back to said transducer, said round trip time being a linear function of said tip-off angle $\theta_T$.

2. The system as defined in claim 1, wherein said reflector block comprises a plurality of reflecting surfaces, each of said reflecting surfaces being at different angles with respect to said planar surface of said deck, each of said reflecting surfaces being perpendicular to the bottom surface of said pallet at a particular tip-off angle.

3. The system as defined in claim 2 wherein said reflector block has four reflecting surfaces, the reflection angles of the surfaces being chosen so that a different surface of said block intercepts and reflects the transmitted pulses at various predetermined pallet positions.

4. The system as defined in claim 3 wherein the transmitted pulses have a beam width equal to approximately 10 degrees, whereby each reflecting surface reflects at least a portion of said beam over a given range of tip-off angles.

5. The system as defined in claim 4, wherein with a tip-off angle $\theta_T$ equal to from 3 degrees up to less than 10 degrees, the transmitted pulses follow path which includes a first reflecting surface of said reflecting block; and wherein with a tip-off angle $\theta_T$ equal to 10 degrees up to less than 16 degrees, then the path of the transmitted pulses includes a second surface of said reflecting block; and wherein with a tip-off angle $\theta_T$ equal to 16 degrees up to less than 24 degrees, the path of the transmitted pulses includes a third surface of said reflecting block; and wherein with a tip-off angle $\theta_T$ equal to 24 degrees up to less than 29 degrees, the path of the transmitted pulses includes a fourth reflecting surface of said reflecting block.

6. The system as defined in claim 1 wherein said reflector block comprises a faceted surface simulating a continuous curved surface, each facet of said surface being substantially perpendicular to the beams at given range of positions of said planar surface.

7. The reflection block of claim 6 wherein the said beam has a width which defines the range over which any of said surfaces is perpendicular to said beam.

8. The reflector block of claim 7 wherein said beam width is approximately 10 degrees.

* * * * *